March 3, 1970   J. B. SPALDING   3,498,348
WORK-HOLDING CARRIAGE FOR SAW TABLE
Filed July 17, 1967
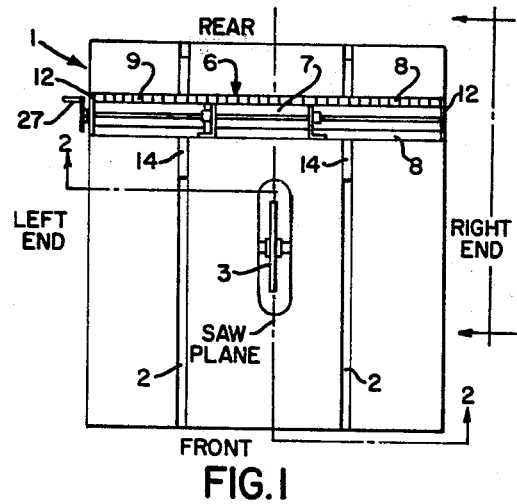
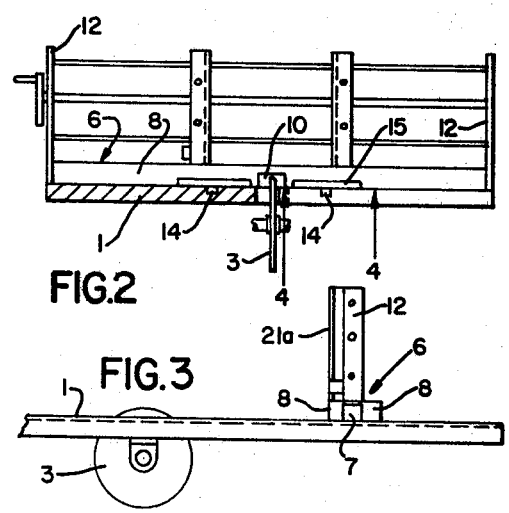
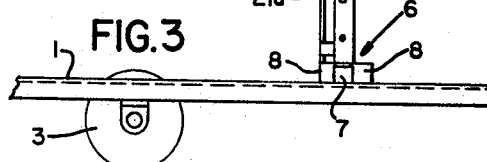
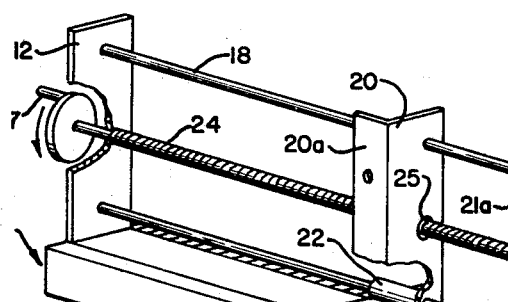
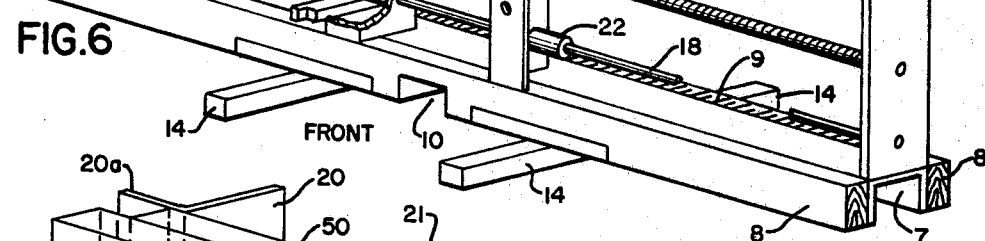
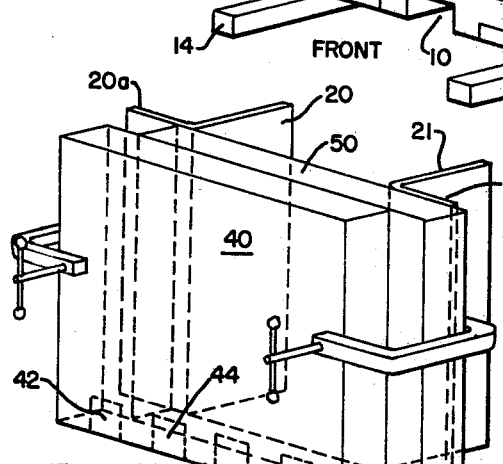
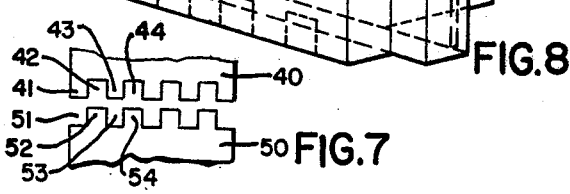
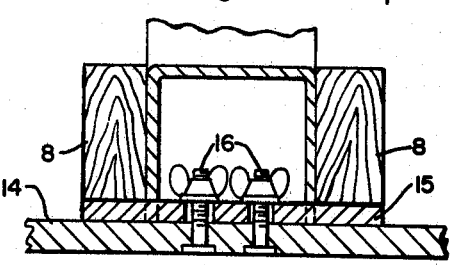
INVENTOR.
JOSEPH B. SPALDING
BY Arthur H. Robert
ATTORNEY United States Patent Office 3,498,348
Patented Mar. 3, 1970

3,498,348
WORK-HOLDING CARRIAGE FOR SAW TABLE
Joseph B. Spalding, 145 Armory Hill,
Springfield, Ky. 40069
Filed July 17, 1967, Ser. No. 653,968
Int. Cl. B27c 5/06; B27f 1/12; B23g 3/18
U.S. Cl. 144—133                    1 Claim

ABSTRACT OF THE DISCLOSURE

An elongate work-holding carriage having an elongate base removably mounted on a saw table to extend legnthwise through the major vertical plane of the table's rotary saw, and a pair of uprights mounted and spaced along the base to receive and hold (between them) one (preferably both) of the wooden parts used in forming a tongue-and groove joint. The base is arranged on the table for table-guided "slot-cutting" movement transversely toward and away from the cutting edge of the saw.

BACKGROUND OF THE INVENTION

Field of the invention

The present invention relates to a work-holding carriage which is intended for use on a saw table in cutting a wide variety of tongue-and-groove joints such as box and splined joints, T, middle and end lap joints, dado box corner joints, etc. More particularly, the invention relates to a work-holding carriage of the type having a base mounted on a saw table for slot-cutting movement parallel to the plane of the saw and an upright work holder mounted on the base for work-positioning movement relative to the base in a direction normal to the plane of the saw.

Description of the prior art

It is desirable to render a conventional saw table capable of cutting a wide variety of tongue-and-groove joints such as box and splined joints, T, middle and end lap joints, dado box corner joints, etc. Accordingly, it is common practice to provide a conventional saw table with a work-holding carriage of the type having a base mounted on the table for manually effected slidable movement in a direction proceeding transversely across the table toward and away from the saw and upright work-holding means mounted on the base for manually effected slidable movement in a direction proceeding longitudinally along the base and table from one position, in which one area of the work to be slotted or grooved is aligned with the saw, to another position, in which another area of the work is aligned with the saw.

In some arrangements, such as are shown in U.S. patents to Schempers #2,581,049 and Johnson #2,616,459, the work-positioning movement is indexed to assure accuracy in the alignment of the work with the saw. In other arrangements, such as is exemplified by the arrangement shown in the Oliveira Patent #2,765,010, the work-positioning movement is effected by a manually-operated screw threaded to the work-holding means.

SUMMARY OF THE INVENTION

Objects of the invention

The important objects of the invention are: to provide a rugged work-holding carriage, which is simply and inexpensively constructed; to provide one which can be easily and quickly adjusted to receive and hold work of varying dimensions over a wide range; which can be easily, quickly and safely operated to cut each of a succession of spaced slots into one or both of the wooden parts to be joined; and which normally will have a long operating life.

Statement of the invention

Substantially all of the foregoing objects can be achieved by doing as follows: (1) providing a horizontally-wide vertically-shallow U-shaped base having an elongate bight and short upright arms; (2) slidably mounting a pair of upright work holders upon a pair of upper and lower guide rods extending longitudinally from one upright arm of the U to the other; and (3) connecting one of the upright work holders to an arm-mounted horizontal screw for manually-actuated screw movement back and forth between the upright arms of the base.

With this arrangement, the upright work holders may be easily and quickly spaced from each other in accordance with the horizontal dimensions of the work, the work may then be easily and quickly secured to the spaced upright work holders so that both work holders and the work form a rigid assembled unit; and that unit may then be easily, quickly and accurately moved slidably into any selected position by manually turning the screw. In the selected position, it is a simple matter to move the carriage, i.e. the base, the upright holders and the work, slidably across the table sufficiently to cut the desired groove into the selected area of the work and then return the carriage as a unit back to its starting position. It is also a simple matter to perform the work-positioning and slot-cutting operations, required for each additional slot or groove, easily, quickly and accurately.

BRIEF DESCRIPTION OF THE DRAWINGS

The preferred embodiment of the invention is illustrated in the accompanying drawings, wherein:

FIG. 1 is a top plan view of a work-holding carriage constructed in accordance with my invention and mounted on a saw table;

FIG. 2 is a partly broken front elevational view corresponding to one taken along line 2—2 of FIG. 1;

FIG. 3 is a right end elevational view corresponding to one taken along line 3—3 of FIG. 1;

FIG. 4 is a bottom plan view of that portion of the carriage lying horizontally between vertical lines 4—4 of FIG. 2;

FIG. 5 is a fragmentary section along line 5—5 of FIG. 4;

FIG. 6 is an enlarged perspective view of the work holding carriage;

FIG. 7 is developed plan view showing two pieces of wood having their two adjacent joinable ends formed with complementary tongue and grooves which are appropriately aligned with but spaced from each other; and FIG. 8 is an enlarged fragmentary perspective view of the central carriage portion of FIG. 6 showing the spaced upright work holders carrying both of the wooden parts of FIG. 7, the foremost of these parts (i.e. the front part) being marked to show its groove-forming areas.

DESCRIPTION OF THE PREFERRED EMBODIMENT

The construction shown in the drawings comprises: a saw table; and the preferred embodiment of my work-holding carriage.

SAW TABLE

The saw table 1, which is illustrated in the drawings, is of conventional character having transversely-extending spaced parallel miter grooves 2 with a saw 3 centrally disposed between the miter grooves in a manner such that its major vertical plane extends transversely parallel to the miter grooves. This plane is herein called the "saw plane."

WORK-HOLDING CARRIAGE

The work holding carriage, as illustrated, comprises: a U-shaped base; transverse guides for the base; a pair of slidable uprights; a pair of horizontal upper and lower guide rods; and an actuating screw.

U-SHAPED BASE

The U-shaped base, which is of horizontally-wide vertically-shallow character, comprises: a horizontally elongate bight; and short upright arms integrally secured to the bight at opposite ends thereof.

The elongate bight 6 extends lengthwise across the table in a position such that the saw plane intersects the center of the bight 6. The bight 6 is composed of an elongate downwardly-open metal channel 7, the front and rear sides of which are flanked by horizontally elongate front and rear wood members or bars 8 of rectangular cross section. The rear bar 8 has its top surface suitably marked with distance graduations as indicated at 9 in FIG. 1.

While channel and bar members 7 and 8, as shown, are formed separately from each other and suitably secured together in any suitable manner, they may, if desired, be formed as an integral metal or plastic unit. However, formed, the base member 6 has its bottom side cut away (or otherwise fashioned) to provide a centrally-located cutter-accommodating passageway 10 extending transversely across the base along the saw plane. It is made wide enough to provide ample accommodation for the single saw 3 and for the multiple saws and other cutting devices which may be substituted for the single saw 3.

The upright arms 12 of the base are in the form of flat metal plates welded or otherwise rigidly secured to the ends of the base channel 6 to extend upright therefrom.

Transverse guides

The carriage is provided with transversely-extending carriage-mounted guide means arranged adjacent the bottom face of the bight of said base in position to cooperate with complementary table mounted guide means in guiding the carriage with the mid-portion of said cutter-accommodating passageway 10 intersected by a vertical saw plane extending transversely through the saw or cutter. Such guide means are shown in the form of spaced parallel guide bars 14 positioned to fit into the miter grooves 2 of the table 1. These carriage-guide bars 14 cooperate with table miter grooves 2 to provide a tongue-and-groove guiding connection between the carriage and the table to insure the accurate slot-cutting or back-and-forth "shuttle" movement of the carriage transversely toward and away from the cutting edge of saw 3. The bars 14 are mounted on transverse (slotted) plates 15 arranged in notches in the bottom of the bight of the U-shaped base and welded or otherwise secured to the bight. The guide bars 14 may be adjustably secured to the plates 15 in any suitable manner as by the pair of bolt and nut connections 16 shown.

Longitudinal guides

The longitudinal guides comprise elongate guide means extending longitudinally from one fixed arm to the other and mounted on both. More particularly, they comprise a vertically spaced pair of upper and lower guide rods 18 extending longitudinally from one base arm 12 to the other and secured to both.

Slidable uprights

The work-holding uprights comprise a pair of longitudinally-spaced, longitudinally-movable uprights arranged between said fixed upstanding arms 12 and positioned to present vertically-arranged work-receiving faces along a vertical plane extending longitudinally adjacent one long margin of the carriage. More particularly, they comprise a left and right pair of horizontally spaced upright metal plates 20, 21; and a flange $a$ on the front vertical edge of each upright. Each upright work holder extends transversely across the combined full width of the channel member 7 and the front bar 8 and each is slidably mounted on both of the (upper and lower) guide rods 18. To this end, the guide rods 18 extend through upper and lower holes in the left and right uprights 20, 21. To facilitate smooth guiding action, each upright is integrally provided with a guide sleeve 22, one for each guide hole. Each sleeve 22 is secured to its upright in any suitable manner such as by welding it thereto or threading it into the corresponding guide hole.

The front vertical edge of each upright work holder is bent laterally toward the corresponding base arm 12 to form the $a$ flanges. Thus flange 20$a$ is provided on the left upright and flange 21$a$ on the right upright. The front faces of the flanges 20$a$ and 21$a$ provide supports against which the work to be cut may be clamped.

Actuating screw

The actuating screw 24 preferably is centrally positioned between the upper and lower longitudinal guide rods 18 and arranged to extend longitudinally from one base arm 12 to the other and rotatably mounted on both. The screw 24 extends through corresponding holes in the uprights 20, 21. It passes freely through hole 25 in the left upright 20 but is threaded to a sleeve 26 which is mounted on right upright 21 in alignment with the corresponding screw accommodating hole. One end of the actuating screw 24 terminates in an operating handle 27, which is shown on the left end of the carriage but may be at the right end thereof.

OPERATION

In operation, the work-holding carriage is mounted on table 1 by inserting its bottom transverse guides 14 into the miter grooves 2 of the table. The spacing between each guide 14 and the vertical transverse center of the centrally located passageway 10 may be adjusted through the connection of its bolts 16 in its slotted plate 15, to equal the spacing between the corresponding miter groove 2 of the saw table and the saw plane. When this is done, the insertion of the transverse guides into the grooves 2 will automatically align the saw 3 with the transverse vertical center of the transverse saw-accommodating recess 10 at the bottom center of the base 6.

As indicated in FIG. 7, we now assume that a wood part 40, having tongue 41, groove 42, tongue 43 and groove 44, is to be joined to a wood part 50 having corresponding groove 51, tongue 52, groove 53 and tongue 54, all tongues and grooves being of the same width. Accordingly, before the tongues and grooves are formed in parts 40 and 50, they are placed in face-against-face relationship with their respective joint edge downward and with part 40 on the front side of part 50. Part 40 is offset horizontally from part 50 sufficiently (to the left) to place the groove-forming areas (for grooves 42 and 44) of part 40 in transverse alignment with the groove-forming areas (for grooves 51 and 53) of part 50. With the parts in this aligned relationship, they are clamped to the flanges 20$a$ and 21$a$ of the left and right upright work holders 20 and 21 as shown in FIG. 8.

As shown in FIG. 8, at least two clamps are provided, one for each upright. Each clamp clamps the work to-be-cut against the work-receiving face of its work-holding upright. In doing so, it cooperates with the other clamp to integrate the uprights and the work into a rigid work-holding assembly which is obviously free of work-clamping pressure extending from one upright to the other.

When clamped, the top of the groove-forming areas in each part must not only be level with each other but also spaced below the horizontal plane of the ceiling of the transverse saw-accommodating passageway 10 in the base. When this is done, the upright work holders 20, 21 and the work parts 40, 50 form a rigid work assembly, which may now be moved as a unit, either leftward or rightward along the bight of the base depending on the direction of rotation of actuating screw.

We shall now assume: that the rigid work assembly is initially located at the extreme right; and that, when the crank 27 at the left end of the screw is rotated clockwise (as seen from the left end and as indicated by the arrow in FIG. 6), the work assembly will move toward the left end of the table. With these assumptions, the screw 24 is rotated clockwise to move the work assembly toward the left and this leftward movement is continued until the transverse vertical center of the aligned groove-forming area (for grooves 42 and 51) is centered in the transverse vertical saw plane.

When centering is accurately achieved (as it may be by correlating the position of the parts 40, 50 with the point at which the saw plane intersects the graduated scale 9) then the carriage, as a whole, is moved forwardly toward the saw 3 until the saw engages parts 40, 50 of the work assembly and cuts grooves 42 and 51. Thereafter, the carriage is moved rearwardly back to its original position and the screw 24 rotated clockwise to move the work assembly leftward sufficiently to center the groove-forming areas for grooves 44 and 53 in the saw plane. Once again, when accurate alignment is achieved, the carriage is moved forwardly to make the cut and then returned to its original position.

In cutting joints, which are the same as or equivalent to some tongue-and-groove joints, conventionally provided special cutters are often used to advantage. In the present case, such special cutters may be substituted for the single saw 3. The illustration of saw 3, as a single saw, is schematic; hence it should be understood that, in cutting grooves such as 42 and 51, saw 3 preferably is of the type, which will cut the grooves throughout their full width and depth in a single forward stroke of the carriage.

Also, while I have shown the work-holding carriage, as being mounted on the table to extend normal to the major rotary plane of the single saw 3, it may very well be mounted on the table to extend parallel to that plane, in which event the work-cutting movement may be effected by moving the rigid work assembly, either relative to the base or with the base, into the cutters. Accordingly, the term "work-carrying movement" may be used to designate either: (a) the work-positioning movement of the rigid work assembly; or (b) the work-cutting movement thereof; or both. As a consequence, the work-carrying movement thus designated may be either relative to the base, or with the base, or both.

Having thus described my invention, I claim:

1. An attachment for a wood-working table having a rotary cutter extending upwardly through and projecting above a transversely-extending slot in the table top, comprising:
  (A) a work-holding, centering and moving carriage removably mountable on said table for movement transversely back-and-forth over the upwardly projecting portion of said cutter from one end of the cutter slot to the other, said carriage including
    (1) an upwardly-open U-shaped base having
      (a) an elongate bight which, when the carriage is mounted on a table top, extends longitudinally thereover with its bottom face closely adjacent thereto,
      (b) a pair of upstanding arms fixedly mounted on opposite end portions of said bight, and
      (c) a cutter-accommodating passageway extending transversely across the mid-portion of the bight and opening downwardly through the bottom face thereof to receive said projecting portion of said cutter when the carriage is moved transversely over the cutter,
    (2) transversely-extending carriage-mounted guide means arranged adjacent the bottom face of said base bight in position to cooperate with complementary table-mounted guide means in guiding the carriage
      (a) with the mid-portion of said cutter-accommodating passageway intersected by said cutter plane,
    (3) a pair of longitudinally-spaced, longitudinally-movable uprights arranged between said fixed upstanding arms
      (a) and positioned to present vertically-arranged work-receiving faces along a vertical plane extending longitudinally adjacent one long margin of the carriage,
    (4) elongate guide means extending longitudinally from one fixed arm to the other and mounted on both arms,
    (5) means slidably connecting one of said uprights to said elongate guide for guided movement longitudinally along the bight toward and away from the other of said uprights to vary the distance from one work-receiving face to the other over a work-accommodating range,
    (6) at least two clamps, one for each upright, each clamp
      (a) clamping the work to-be-cut against the work-receiving face of its work-holding upright and
      (b) cooperating with the other to integrate the uprights and the work into a rigid work-holding assembly, which is free of work-clamping pressure extending from one upright to the other, and
    (7) means connected to said other upright for moving it to adjust said rigid work-holding assembly as a unit longitudinally back-and-forth along said bight to position a desired area of the work to-be-cut in transverse alignment with said rotary cutter.

References Cited

UNITED STATES PATENTS

| | | | |
|---|---|---|---|
| 515,174 | 2/1894 | Slee | 83—409 |
| 2,918,953 | 12/1959 | Wraight | 143—174 X |

FOREIGN PATENTS 75,996  10/1917  Switzerland.

DONALD R. SCHRAN, Primary Examiner

J. F. COAN, Assistant Examiner

U.S. Cl. X.R.

83—412; 144—91, 136; 143—168; 269—60